Jan. 12, 1965   C. L. PILLMORE ET AL   3,164,905
UNIVERSAL TRACING TABLE

Filed Aug. 16, 1961   2 Sheets-Sheet 1

INVENTORS
CHARLES L. PILLMORE
ROBERT H. MORRIS
BY Ernest S. Cohen
Gersten Sadowsky
ATTORNEYS Jan. 12, 1965  C. L. PILLMORE ET AL  3,164,905
UNIVERSAL TRACING TABLE
Filed Aug. 16, 1961  2 Sheets-Sheet 2
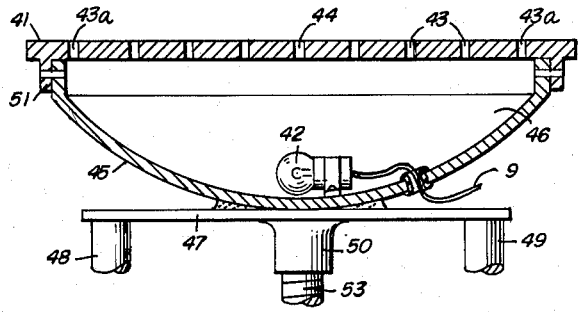
FIG. 2
FIG. 3
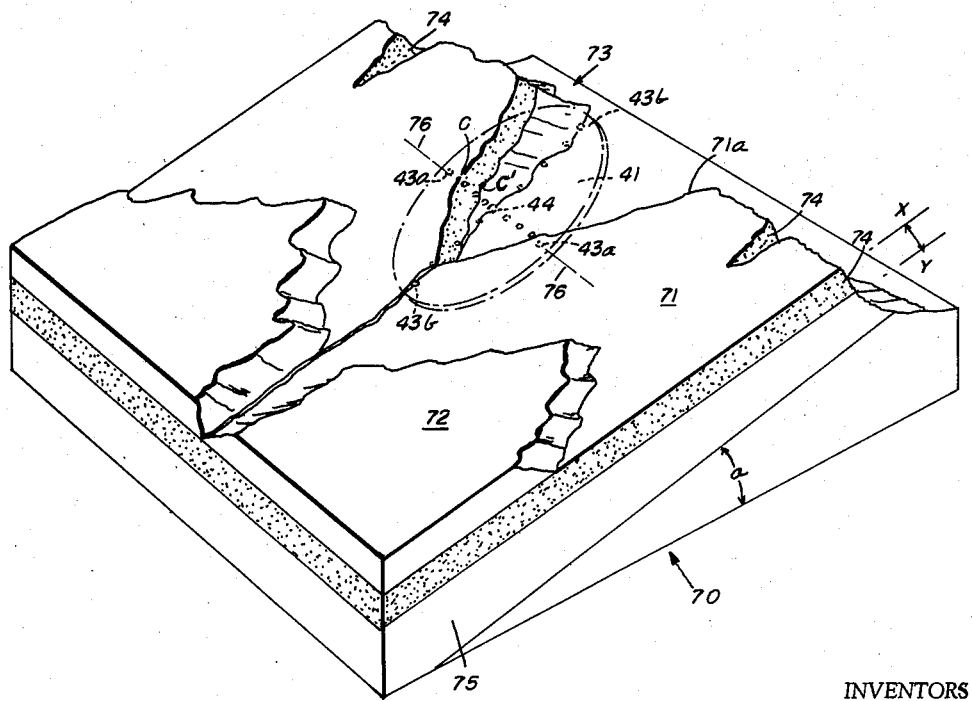
INVENTORS
CHARLES L. PILLMORE
ROBERT H. MORRIS
BY
ATTORNEYS

United States Patent Office 3,164,905
Patented Jan. 12, 1965

3,164,905
UNIVERSAL TRACING TABLE
Charles L. Pillmore, Denver, Colo., and Robert H. Morris, College of Porto Allegre, Brazil, assignors to the United States of America as represented by the Secretary of the Interior
Filed Aug. 16, 1961, Ser. No. 131,943
6 Claims. (Cl. 33—1)
(Granted under Title 35, U.S. Code (1952), sec. 266)

The invention herein described and claimed may be manufactured and used by or for the Government of the United States of America for governmental purposes without the payment of royalties thereon or therefor.

This invention relates to improvements in a plotting or tracing table having particular utility in photogrammetric apparatus for making contour maps. In an apparatus suitable for this purpose, an arrangement of two stereoscopic projection devices are directed to follow the movement of the tracing table over a surface covered by a contour map, and to produce on a platen of the tracing table, a pair of overlapped images which may be seen as a single three dimensional image by stereoscopic viewing means. A tracing stylus fixed to the tracing table is effective to form the lines of the contour map as the table is moved about. A diagrammetric view of one form of this apparatus may be seen in FIG. 1 of the U.S. Patent No. 2,833,178, issued to H. T. Kelsh, on May 6, 1958.

Made possible by the improvements of the present invention are very accurate measurements of attitudes and thicknesses of rock formations shown in aerial photographs made in surveying the terrain of inaccessible land areas. The invention is highly effective for making measurements of such formations in strata where the attitudes of the dips or slopes are greater than two or three degrees. Formerly such measurements were obtained by methods involving trigonometric calculations, or by graphic means using data obtained from standard tracing tables. Inherent in such methods are errors in calculations, and line-thickness errors of graphic determinations. By means of the present invention it is possible to accurately measure attitudes and thickness of outcroppings to within two feet.

It is an object of this invention to provide a tracing table having a platen, with a particular arrangement of illuminated markings to enable direct and accurate measurements of the thickness of dipping or sloping strata visible in the three dimensional image projected on the platen.

Another object is to provide supporting means for the platen connecting it to the tracing table frame for tilting movement relative thereto for enabling direct and accurate measurement of the attitude of dipping or sloping strata of the stereoscopic model visible in the image projected on the platen.

A further object of the invention is to provide a tracing table of rugged construction, by means of which reliable thickness data and accurate dip or slope measurements may be obtained by using it with a projection-type plotter and aerial photographs.

Other objects and advantages of the present invention will become more fully apparent from the following description of a preferred embodiment of the invention, considered together with the accompanying drawing wherein:

FIG. 2 is a fragmentary sectional view of the platen, its housing and supporting elements, and FIG. 3 is a schematic representation of a section of a dipping terrain having superimposed thereon the indicator elements of the platen.

Figure 1:
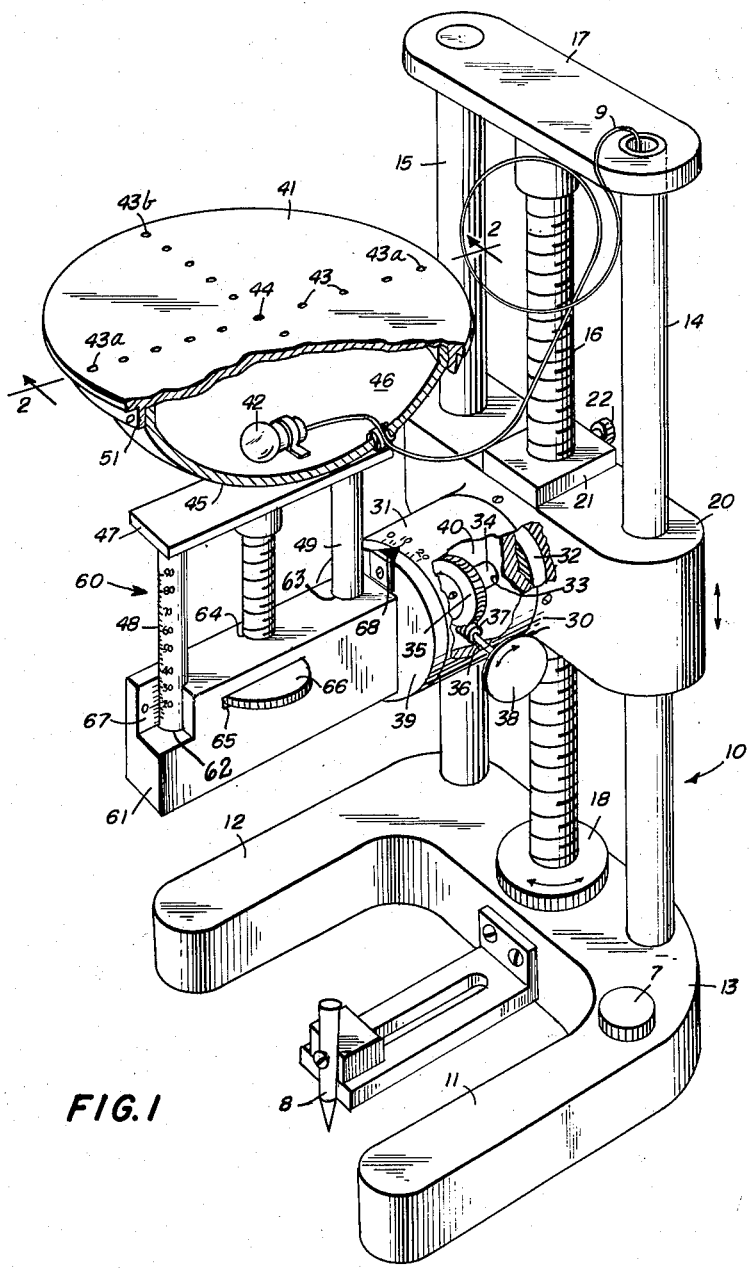
FIG. 1 is a general perspective view with a part cut away, of a tracing table incorporating the improvements of the present invention.

The improved platen and positioning drive therefor, of the present invention may be made part of an arrangement having a conventional tracing table frame. As shown in FIG. 1 of the drawings, a frame 10 includes a base of two curved side legs 11 and 12, joined to form a back portion 13, each part having a substantially rectangular cross-section. Attached to the inside surface of the back portion 13, and centered between the legs 11, 12, is a conventional writing implement 8, for marking the contour lines or other detail observed in the stereoscopic model, on the map surface over which the tracing table may be moved. Fastened into sockets on the upper surface of portion 13, are the ends of two spaced apart and parallel rods 14 and 15. In a vertical plane defined by the parallel rods, and spaced between them, is an elongated drive screw 16, rotatable in a bearing socket in portion 13 of the base 10. A head bracket plate 17 fixed to the upper ends of rods 14 and 15, maintains their alignment, and at its center provides a bearing in which the screw 16 may turn. A knob 18 near the lower end of screw 16, is made integral therewith for turning the screw in its bearing supports. Reference may be made to FIGS. 2 and 3 of the aforementioned Kelsh patent for a typical prior art construction of this nature.

Mounted to slide along rods 14 and 15, and to be guided thereby, is an elevator frame 20, having appropriately spaced apart holes therein to accommodate the rods. Also provided in elevator 20, is a threaded hole aligned in the plane defined by rods 14 and 15, and centrally situated between the spaced apart holes, to receive drive screw 16. As is evident from this arrangement of parts, the vertical position of elevator 20 may be conveniently determined by merely adjusting knob 18 to turn the drive screw in the threaded hole of the elevator. A threaded block 21 equipped with a set screw 22 is rotatable on the drive screw 16, to come into contact with and be secured to plate 17, to act in the usual manner, as a locking nut for the drive screw 16.

The improved mechanism by means of which are accomplished the tilt or dip of the tracing table platen and the movement of the platen normal to the plane into which it is tilted, and the elevator 20 are joined by a support arm 30 extending perpendicularly out of the vertical face of the elevator. Arm 30 is a short cylindrical element attached at one end as an integral part of the elevator. At its extended end the arm is formed to effect a socket-like opening adapted to receive and have secured therein by set screws, a stub end 32 of a cylindrical gear housing 31. At the opposite end of the housing, the cylindrical surface defines a sleeve portion into which is fitted an extension 39 from a platen normal drive mechanism 60. The space enclosed within the gear housing 31, between the extension 39 and the inner wall of the housing's stub end 32, constitutes a gear chamber 40. A centered hole 33 through the aforesaid inner wall, opens into an enlarged hole in the outer face of the stub end.

Details of the platen tilt drive mechanism shown in the cut away view of the housing 31 in FIG. 1, also includes a shaft 34, one end of which is tight fitted into a centered hole in the end face of extension 39 to be integral therewith, and the other end of which is supported for rotation in a bearing formed by hole 33 of the housing 31. Mounted on the shaft 34 for rotative movement in the housing gear chamber 40, is a worm gear 35 having a hub thereon in contact with the end of extension 39, and fixed to the shaft by a pin through the hub and shaft. In a hole through the cylindrical wall of the housing 31, a bushing 36 provides a bearing for the shaft of a worm 37, tangentially engaged with the teeth of the worm gear 35. A knob 38 fixed to the end of the worm shaft outside the housing facilitates the turning of the worm gearing such that shaft 34 is angularly displaced in its bearing hole 33, to turn the extension 39 in the housing sleeve and thereby tilt the platen arrangement connected thereto. By this means the circular platen may be dipped such that an axis perpendicular through the center thereof is tilted in a plane parallel to that defined by the rods 14 and 15, from a position vertical to the plane of the base, to an angle of forty-five degrees in either direction.

The disk-like member constituting the platen 41, includes a perfectly flat top surface enamelled or polished and buffed to a matte or flat finish, and an under surface having formed thereon a raised circular rim 51, slightly spaced from and concentric with the outer rim of the platen. Referring to FIG. 2, there is shown a recessed area on the under side of the platen, formed by the raised rim 51, which permits the platen to be slipped upon and cover a concave dish-shaped lamp housing 45. Set screws through the raised rim contact the outer surface of housing 45, to secure the platen thereto. A close inspection of the platen face reveals an arrangement of small holes drilled vertically through the thickness of the platen disk. Constituting this arrangment are two rows of eight evenly spaced holes 43a, and 43b, defining two straight lines intersecting at right angles over a center hole 44. To facilitate a rapid identification of the form of this pattern on a stereoscopic model, the diameter of the hole 44 at the center, is made .006 inch, the holes 43a, 43b at the outer ends of each line, are made .015 inch, and the holes 43a, 43b in between, are made .009 inch. A leveled platen positions the center hole 44 directly above the writing implement 8 of the tracing table. The inner surface 46 of the housing 45 is silvered to reflect the light from a small light bulb 42, in a socket attached to surface 46, to locate the bulb at a central point below hole 44, and near the bottom of the housing.

A platform structure including a rectangular platen support bar 47 mounted on guide rods 48, 49, and having fixed thereto a bearing socket 50 for the normal drive screw 53, operatively associates the platen 41 and its lamp housing 46 to the normal drive mechanism 60. As shown in FIG. 2, the housing 45 is centered and fastened on the bar 47, such that the reflecting face of the platen 41 is parallel to this bar. Rods 48 and 49 fastened to the bar 47, and drive screw 53 rotatably supported in socket 50, define a plane which includes the straight line defined by the holes 43a, 44 on the face of the platen.

A unitary rectangular bar-like structure 61 forms the hub of the normal drive mechanism 60. This bar-like structure may be produced by milling a length of cylindrical stock to form the rectangular block 61 as an integral part of the material forming the short cylindrical extension 39. Two centrally located spaced apart holes 62, 63, drilled vertically through milled bar 61, are adapted to receive platen guide rods 48, 49. Evenly spaced between holes 62, 63, and in the plane defined by the guide rods, a third hole 64 is drilled to receive for rotation therein, the normal drive screw 53. At a location conveniently spaced from the upper surface of the milled bar 61, a wide rectangular slot 65 is cut to be parallel to the outer surfaces of the bar. The central axis of the hole 64 passes through the midpoint of the slot. A disk 66 of appropriate diameter having a threaded hole through its middle, is slipped into the slot 65, to align its opening with the hole 64, whereby the threads on the inserted drive screw 53 may be cooperatively engaged with the threads in the hole of the disk. Serrations along the rim of disk 66 which extends out of the slot 65, facilitate the turning of the disk such that screw 53 is driven thereby to adjust the normal position of the platform-like structure to which the platen is fastened. Rods 48 and 49 slide in their respective holes 62 and 63 to hold and guide this structure in its movements.

A rectangular block portion of an upper and outer corner of the milled bar 61, is cut away to expose a portion of the hole 62. The rod 48 accommodated in this hole, is calibrated along its length to cooperated with a fiducial mark and vernier calibrations inscribed along a vertical wall 67 of the cut-away adjacent the hole 62. A pointed element 68 fastened to the extension 39 is aligned to have its indicator tip in the plane defined by rods 48, and 49. Indicator 68 cooperates with angular degrees calibrations inscribed across a portion of the cylindrical housing 31, adjacent the extension 39. As is obvious from the structural cooperations hereinbefore described, readings taken from the calibrations indicated by means of elements 67 and 68 represent the elevation normal to the tilted platen, and the attitude, or angle of tilt of the platen, respectively. An additional indicator may be a conventional counter device connected to be actuated by the rotation of drive screw 16. This device would be operative to indicate the relative position of elevator 20 on its supporting elements, and therefore the basic elevation of the platen carried by the elevator. An illustration of this arrangement may be found in FIG. 1 of U.S. Patent No. 2,740,318, to J. V. Sharp, issued April 3, 1956.

A 12 volt A.C. source is used in the present embodiment to supply electrical power to the bulb 42. Loosely coiled wires 9, from the bulb socket are pulled through the hollow interior of rod 14 to connect to a dimmer rheostat 7 installed on the top of the base leg 11. The rheostat is connected to the 12 volt source by a conventional lead-in power cord. Additional small lights connected to the power cord through toggle switches on the base, may be attached near the dip indicator and platen normal vernier so that the related scales are more easily read in darkened plotter rooms. As a further modification, the platen and the lamp in a platen housing structure, may be replaced by an electro-luminescent panel appropriately designed to present a platen having a proper arrangement of illuminated spots.

In the geologic study of a terrain, the improved tracing table of the present invention is made operative as a part of a double projection stereoscopic plotter apparatus as hereinbefore explained with reference to the patent to Kelsh. The FIG. 3 representation of a fragmentary stereoscopic model 70 of the terrain as viewed on the platen 41, shows a sloping or dipping terrain 71, 72, and an outcropping 73 including a distinguishing stratum 74. The bed of material forming this stratum has a dip of angle $\alpha$, as indicated by the cross-section showing dip of the beds 75. To find the attitude and thickness of bed 74, an initial adjustment is made by turning knob 18 to cause elevator 20 to bring the illuminated center hole 44 of a level platen to a reference point C at the upper margin or trace 71a, of the stratum. Thereafter the entire tracing table is moved about hole 44 as a center, so as to position a line 76 defined by the illuminated holes 43a on the platen, in the plane of the terrain surface 71. This may be preferably accomplished by orienting the line 76 to intersect the trace 71a at two points of equal elevation such as shown in FIG. 3, to be at opposite sides of the gap in the surface 71 defining the trace 71a. Tilt drive knob 38 is then turned to adjust the inclination of the platen 41 and mechanism 60, such that the platen is inclined sufficiently to align illuminated holes 43b to the inclination of the plane defined by the points along trace 71a. Thus the plane of the platen 41 (as defined by the holes 43a and 43b), is aligned parallel to and coincident with the plane of the dipping bed 74. A reading is now taken of the angle of dip from the calibrated scale associated with indicator element 68. Following this, the tracing table is moved laterally in the direction of line 76 to bring center hole 44 to be above the lower margin of stratum 74. A reading is made of scale 67 on rod 48. The dip normal adjustment disk 66 is then turned to lower the platform-like structure carrying the platen until hole 44 coincides with a point C′ selected on the lower margin of stratum 74. A second reading is taken from the scale on rod 48 as indicated by the center mark on vernier 67. It is evident that since all holes on line 76 are at the same elevation, this measurement may be taken without first moving the tracing table laterally, by merely turning adjusting disk 66 and noting the reading at indicator 68, when any hole 43a on line 76, coincides with the lower margin at point C'. It is now evident that the reading noted at indicator 68 corresponds to the dip angle of strata 74. Also clear is that the difference in the readings from the indicator arrangement 67 corresponds to the value of a measurement taken normal to the plane of dip, and which value when properly scaled in accordance with procedures well known in the art for this apparatus, is the thickness XY of the bed 74 of the stratum.

As will be obvious to those skilled in the art, changes and substitutions and rearrangement of parts may be made in the preferred embodiment described herein, without departing from the spirit of the invention.

We claim:

1. A tracing table having utility in a double image stereoscopic projection-contour mapping apparatus, including a base and means on said base supporting an elevator structure for displacement within a plane normal to said base, said elevator structure being operable for moving a platen in a straight path normal to the plane of the base, the platen having a substantially flat reflective surface, the improvement comprising means connecting the platen to the elevator structure, said means comprising a platform structure to which the platen is fastened, and adjustable means supporting the platform structure to angularly reposition it about an axis parallel to the plane of the base and normal to said plane in which the elevator structure is displaceable, whereby the platen surface attached to the platform structure is moved from a horizontal attitude to a sloping attitude, said adjustable means also operable to move the platform structure and the platen therewith in a straight path normal to the plane of the platen surface.

2. In a tracing table arrangement having utility in a double image stereoscopic projection-contour mapping apparatus, said arrangement including a base and movable means operably maintained on said base for linear displacement relative thereto, an improvement comprising a platen having a substantially flat reflective surface, means supporting said platen, means connecting said supporting means to said movable means and operable for angularly displacing the supporting means, the latter comprising adjustable means for linearly displacing said platen relative thereto, said platen surface being provided with two rows of relatively small holes intersecting at the center of the platen, and means fastened to said platen to illuminate said holes.

3. The tracing table and improvement of claim 1, and said platen surface being provided with two rows of relatively small holes intersecting at the center of the platen, and means fastened to said platen to illuminate the holes.

4. The tracing table and improvement of claim 3, and said platen surface being provided with two rows of relatively small holes intersecting at right angles over a hole at the center of the platen, and means fastened to said platen to illuminate all said holes.

5. In the tracing table arrangement of claim 2, and the improvement comprising the platen surface thereof, the two rows of relatively small holes being provided to intersect at right angles over a hole at the center of the platen.

6. A tracing table having utility in a double stereoscopic projection-contour mapping apparatus, including a base having operatively supported thereon an elevator structure movable relatively to said base, means operatively disposed on said base for guiding and driving said elevator structure for displacement within a plane normal to the plane of said base, a platen structure having a substantially flat reflective surface, and further means operatively associating said elevator structure to said platen structure whereby said elevator structure is operable to move said reflective surface in a straight path normal to the plane of said base, the improvement residing in said further means being arranged to extend from said elevator structure and including settable means to control the displacement of said reflective surface into predetermined positions, said settable means comprising a platform structure having said platen structure fixed thereto, a second guiding and driving means operatively connected to said platform structure to displace it in a straight path normal to the plane of said platen reflective surface, and an adjustable means joining said second guiding and driving means to said elevator structure and operative through said juncture to displace said platform structure and the platen reflective surface therewith to different angular positions about an axis parallel to the plane of the base and normal to the plane in which said elevator structure is displaceable.

References Cited by the Examiner

UNITED STATES PATENTS

| 1,807,999 | 6/31 | McMurtry | 33—174 |
| 1,909,923 | 5/33 | Von Bertrab | 33—20 |
| 2,480,618 | 8/49 | Tresidder | 33—174 |
| 2,589,824 | 3/52 | Kuipers | 33—20 |
| 2,676,409 | 4/54 | Gamble | 33—1 |
| 2,740,318 | 4/56 | Sharp | 33—20 X |
| 2,833,178 | 5/58 | Kelsh | 33—20 X |
| 2,871,563 | 2/59 | Sawyer et al. | 33—1 |

FOREIGN PATENTS

| 597,515 | 1/48 | Great Britain. |
| 660,628 | 11/51 | Great Britain. |

ISAAC LISANN, *Primary Examiner.*

L. R. PRINCE, *Examiner.*